United States Patent Office 2,866,298
Patented Dec. 30, 1958

2,866,298

METHOD OF JOINING GLASS PARTS

Clarence L. Babcock, Toledo, Ohio, assignor to Owens-Illinois Glass Company, a corporation of Ohio No Drawing. Application January 27, 1956
Serial No. 561,940

1 Claim. (Cl. 49—82)

This invention relates to the manufacture of glass articles and particularly to the type where it is found necessary to assemble separate prefabricated glass parts and to join them in some manner, such as by fusing or welding, to form thereby a single item. For example, to form a glass block or a cathode-ray tube it is required to join two prefabricated glass parts to form a single composite article.

The joining of such parts, particularly direct glass-to-glass joining, involves the use of rather high temperatures in order that the glass parts may be fused one to another. The generation of such high temperatures creates conditions detrimental to the glass parts such as deformation of local or extensive areas to be joined as well as permanent stresses which may subsequently result in breakage of the joined parts either spontaneously or from some form of shock. Such high temperature sealing or fusing may not be safely employed in joining certain glass blocks, for example, one where a color screen is imposed between the halves. Also, in fabricating cathode-ray tubes for color TV reception, the internal color grids and phosphors are damaged or distorted by exposure to such required high temperatures.

In order to avoid these objectionable features in sealing or joining glass parts it is proposed to employ a new method of forming the joint between two or more separate glass parts by the use of glass soldering or brazing compositions. The method is accomplished by such brazing or soldering glasses which are essentially glass compositions having the special properties of softening and sealing at relatively low temperatures. Examples of such special sealing compositions are set forth in copending patent application, Serial Number 481,008. The present method is applicable to the glass sealing compositions set forth therein as well as numerous other vitreous sealing compositions which have the properties of being able to soften, seal together, or seal to other glasses at temperatures below which would normally be required to join the separate glass parts in a direct glass-to-glass seal.

Accordingly, it is an object of this invention to provide a method of forming vitreous seals between two or more preformed hard glass parts wherein the seal can be made at temperatures below which distortion of the hard glass parts is experienced.

Another object of this invention is to provide a method of sealing or assembling prefabricated hard glass members into composite articles by the use of low melting sealing compositions interposed between the sealing surfaces of the glass parts.

Another object of this invention is to provide means of joining a plurality of preformed soda-lime-silica glass parts with a sealing glass composition at a temperature below which permanent stresses are introduced into the glass parts or joint.

It is a further object of this invention to provide a sealing method for preformed hard glass parts and compatible sealing compositions based on their respective liner coefficients of thermal contraction below the annealing point of temperatures of the hard glass parts and the sealing compositions having softening point temperatures less than the said annealing point temperatures of the hard glass parts.

It is a further object of this invention to provide a method of assembling prefabricated glass parts into composite relationship with lower melting glass compositions having physical properties and characteristics which will permit successive sealing together of the glass parts, opening the sealed parts, and resealing said parts several times in spaced succession.

The specific nature of this invention, as well as other objects and advantages thereof, will become apparent to those skilled in the art from the following detailed description.

As one illustration of the application of this invention, reference will hereinafter be made to the sealing together of an all-glass cathode-ray tube, for example, a tube of a type to be used in the production of colored television images. In such sealing it is, of course, essential that the temperatures required to seal the hard prefabricated glass parts together be maintained at a level below that which would be apt to distort such items as the shadow mask or damage the phosphors, both of which form essential parts of the tube mechanism. The sealing temperatures are also limited by the annealing point temperatures of the glass parts which are to be joined and must of necessity be below approximately 425° C. It is clearly apparent that resort to the subject method is necessitated where glass tube envelopes or glass block structures contain accessory elements which cannot be raised to the temperatures necessary to effect a direct glass-to-glass seal of the hard glass parts.

As an example of a direct glass-to-glass seal, if the two glass parts to be joined are composed of glass #2 (see Table I), or #1 and #2, then the seal would be made at temperatures of 650° to 700° C. or above and the sealed unit annealed at near 450° C. following the present well-known sealing art. If the two glass parts or envelopes are composed of hard glass #1 or #2 and contain temperature-sensitive internal elements which cannot be heated above 425° C., then the subject method is particularly useful for effecting a satisfactory seal or joint between a plurality of glass parts.

It is known in the sealing art that the annealing and contraction characteristics of the glasses to be sealed in a direct glass-to-glass seal must be reasonably well matched to affect a good seal. Usually the annealing point temperatures of the two glasses should be nearly the same to produce a good seal, and moreover, the contraction characteristics should be the same within close limits. This has been found to be true in direct glass-to-glass sealing, but does not suffice for the requirements of a glass-to-glass seal in which a lower melting glass sealing composition is employed to form the joint.

The glass parts which are to be sealed together must have surface or edge portions which are approximately flat or have opposing surfaces of mating contour. At least one of the edges of the parts to be joined is coated with a glass sealing composition and juxtapositioned on one another in sealing alignment. The superimposed parts may then be subjected to a temperature below that which would impart permanent stress to the glass parts, but still of a degree sufficient to melt the sealing composition to the glass parts thereby joining the glass parts to each other. Pressure may be applied to the parts when being sealed if desired or required and may be either fluid or mechanical.

In the following table are listed five glass compositions, the first three of which (Nos. 1, 2 and 3) are referred to as hard glasses while the latter two (Nos. 4 and 5) are referred to as low melting glass sealing compositions. The term "hard" glass is intended to include higher melting glass compositions such as the common soda-lime-silica glasses to differentiate them from the lower melting, glass-like compositions which are herein referred to as "sealing compositions."

TABLE I

| Number | 1 | 2 | 3 | 4 | 5 |
| --- | --- | --- | --- | --- | --- |
| Composition: | | | | | |
| $SiO_2$ | 56.6 | 63.43 | 64.38 | 12.7 | |
| $Al_2O_3$ | 1.5 | 1.08 | 4.41 | | |
| CaO | | 0.70 | 0.15 | | |
| MgO | | | 0.10 | | |
| BaO | 10.0 | 9.60 | 12.68 | 3.0 | |
| $Na_2O$ | 3.0 | 6.90 | 7.21 | | |
| $K_2O$ | 10.0 | 10.05 | 9.34 | | |
| $Li_2O$ | | | 0.55 | | |
| PbO | 18.9 | 7.54 | | 72.3 | 71.0 |
| $B_2O_3$ | | | | 12.0 | 17.0 |
| ZnO | | | | | 9.0 |
| CuO | | | | | 3.0 |
| $Sb_2O_3$ | | 0.40 | 0.51 | | |
| $F_2$ | | 0.52 | 1.15 | | |
| ($-O_2$ equivalent) | | $-0.22$ | $-0.48$ | | |
| | 100.00 | 100.00 | 100.00 | 100.00 | 100.00 |
| Fiber Softening Point (° C.) | 662 | 637 | 634 | 461 | 404 |
| Annealing Point (° C.) | 457 | 440 | 434 | 403 | 330 |
| Strain Point (° C.) | 425 | 409 | 404 | 389 | 320 |
| Contraction Coefficient Annealing Point to 25° C. ($\times 10^{-7}$) | 113 | 118 | 126 | 107 | 103 |

Two or more glass parts made of hard glass #2, for example, can be joined with soft glass #4, the compositions of which are shown in the table. These glasses have annealing point temperatures of 440° C. and 403° C., respectively, and thermal contraction coefficients through the temperature range from their respective annealing points to room temperature (25° C.) which differ considerably. The contraction coefficient of sealing composition #4 is approximately 9 percent less than that of the hard glass #2. The most satisfactory results have been attained when the linear coefficient of thermal contraction of the soft glass is about 5 to 15 percent less than the contraction coefficient of the hard glass to be joined through the temperature ranges from their respective annealing points down to room temperature (25° C.). The seal in this case would have to be made at a temperature of near 460° C., the fiber softening point of sealing composition #4. This temperature is higher than the annealing point of glass #2 (440° C.) and will therefore produce a joint having properties of deformation and stress development within glass #2. Also, damage to internal accessory elements within the glass envelope would result due to their common feature of being unable to withstand temperatures above 425° C. Therefore, glass #4 is considered unsuitable within the meaning of this invention for joining either glass #2 or #3 if development of stress and deformation is of prime consideration. As stated, such conditions are objectionable in the fabrication of cathode-ray tubes for color television.

In addition to having a contraction coefficient of the stated lesser amount, the sealing composition must have a fiber softening point less than the annealing point of the hard glass parts to be sealed. This is desirable to avoid the development of deformation or stresses in the hard glass parts a well as in the joint formed by the sealing composition.

Two glass parts composed of hard glass #2, for example, can be sealed together using sealing composition #5 into an effective seal which will fulfill the objectives of this invention. These glasses have annealing points of 440° C. and 330° C., respectively, with the sealing composition having a contraction coefficient which is approximately 13 percent less than that of glass #2. The fiber softening temperature of 404° C. of sealing composition #5 will permit the fabrication of a joint at near this temperature which is considerably below the annealing point temperature (440° C.) of the hard glass #2. It is clearly apparent that sealing composition #5 can readily be applied to sealing glass parts composed of hard glasses Nos. 1, 2 and 3. Glass #3 has the lowest annealing point (434° C.) of the hard glasses which is 30° C. higher than the fiber softening point of sealing composition #5. Sealing composition #4 is unsuitable for sealing glasses Nos. 1 and 2 for cathode-ray tubes because its fiber softening point of 461° C. exceeds the annealing points of the two hard glasses, but it may be safely employed where the sealing temperatures are permitted to exceed approximately 460° C. Thus, composition #4 may be used to seal parts composed of hard glass #3 at a temperature of near 460° C.

The following table indicates the various combinations of hard and soft glasses which have been firmly joined by the present method.

TABLE II

| Combination | | Percent Reduction in Contraction Coefficient | Approximate Sealing Temperature, ° C. |
| --- | --- | --- | --- |
| Soft Glass | Hard Glass | | |
| 4 | 1 | $6/113 \times (100) = 5\%$ | 461 |
| 4 | 2 | $11/118 \times (100) = 9\%$ | 461 |
| 5 | 1 | $10/113 \times (100) = 9\%$ | 404 |
| 5 | 2 | $15/118 \times (100) = 13\%$ | 404 |
| 4 | 3 | $19/126 \times (100) = 15\%$ | 461 |

The hard glasses are shown to have linear coefficients of thermal contraction in the range of 100 to $130 \times 10^{-7}$ through the temperature range of from their individual annealing points to room temperature (25° C.). Glasses having contraction coefficients in this range are able to be sealed at lower temperatures with the illustrated sealing compositions, the effective sealing temperatures being the fiber softening temperatures of the sealing compositions.

The annealing of a sealed unit incorporating two glasses, one hard and one soft such as #2 and 5 respectively, can be accomplished in a number of ways depending upon the desired object. The following data was obtained in thermally sealing face plates to funnels of all-glass cathode-ray tube envelopes.

(a) If the sealed unit is annealed following the usual schedule for hard glass #2, then the sealing composition #5 in the joint will be near neutral in stress when brought down to room temperature (25° C.). Sample data:

| Sample: | Stress, p. s. i., in glass #2 |
| --- | --- |
| 1 | compression__ 150 |
| 2 | do____ 175 |
| 3 | do____ 230 |
| 4 | tension__ 280 |
| 5 | do____ 180 |
| 6 | do____ 200 |

(b) If the sealed unit is annealed for glass #2 and quenched from 360° C., which is below the strain point of glass #2, then the sealing composition #5 will be under slight tension when brought down to room temperature (25° C.). Sample data:

| Sample: | Stress, p. s. i., in glass #2 |
| --- | --- |
| 1 | compression__ 300 |
| 2 | do____ 640 |

(c) If the sealed unit is annealed for glass #2 and for sealing composition #5, then the sealing composition #5 will be under slight compression when brought down to room temperature (25° C.). Sample data:

| Sample: | Stress, p. s. i., in glass #2 |
| --- | --- |
| 1 | tension__ 350 |
| 2 | do____ 310 |

Note: In the above examples, the stress values refer to glass #2. Stress of the same amount but of opposite sign is inferred for sealing composition #5.

Best results of the subject method have been achieved following the annealing procedures disclosed in examples (a) and (c), although (b) may be satisfactory in some cases.

The maximum sealing temperature contemplated in this method is of the order of approximately 500° C. Naturally this temperature varies depending upon the sealing composition employed and the nature of the composition of the hard glass parts. For most practical purposes the application of this method can be carried out at a maximum temperature of approximately 480° C. When the softening temperature of the sealing composition is lower than the annealing and strain point temperatures of the higher melting hard glass, the joining of the parts may be effected without the establishment of stress or deformation in the joined parts. The preferred joint is obtained with hard glass parts having either identical or substantially equal contraction coefficients and a sealing composition having a contraction coefficient approximately 5 to 15 percent less and a fiber softening point temperature of the order of 400° to 420° C.

Various modifications may be resorted to within the spirit and scope of the appended claim.

I claim:

A method of joining preformed glass parts at relatively low temperatures comprising the steps of coating the sealing surface of at least one of the glass parts with a glass sealing composition, said glass parts having coefficients of thermal contraction in the range of $100-130 \times 10^{-7}$ through the temperature range from their respective annealing point temperatures to room temperature (25° C.), said glass sealing composition having a coefficient of thermal contraction of 5 to 15 percent less than that of the said glass parts and a fiber softening point temperature of less than 480° C. and below the annealing point temperature of said glass parts, joining said parts, and thermally fusing said sealing composition between the sealing surfaces of the glass parts at a temperature in the range of from about 410 to 480° C. and below the annealing point temperatures of said glass parts and above the fiber softening point temperature of the sealing composition.

References Cited in the file of this patent
UNITED STATES PATENTS

| | | |
|---|---|---|
| 2,454,607 | Leberknight et al. | Nov. 23, 1948 |
| 2,643,020 | Dalton | June 23, 1953 |
| 2,693,668 | Slayter | Nov. 9, 1954 |
| 2,744,034 | Dalton et al. | May 1, 1956 |